Aug. 10, 1965    N. B. KELL    3,199,496
ROTARY INTERNAL COMBUSTION ENGINE
Filed June 22, 1961    2 Sheets-Sheet 1

INVENTOR.
Nathaniel B. Kell
BY
E. W. Christen
ATTORNEY

Aug. 10, 1965    N. B. KELL    3,199,496
ROTARY INTERNAL COMBUSTION ENGINE
Filed June 22, 1961    2 Sheets-Sheet 2

INVENTOR.
Nathaniel B. Kell
BY
E. W. Christen
ATTORNEY

United States Patent Office 3,199,496
Patented Aug. 10, 1965

3,199,496
ROTARY INTERNAL COMBUSTION ENGINE
Nathaniel B. Kell, Indianapolis, Ind., assignor to General Motors Corporation, Detroit, Mich., a corporation of Delaware
Filed June 22, 1961, Ser. No. 118,881
2 Claims. (Cl. 123—8)

This invention relates to rotary internal combustion engines, and more particularly to a rotary internal combustion engine having a triangular rotating piston operable in a generally rectangular chamber to drive a crankshaft.

Rotary internal combustion engines are well known in the art but have so far proven impractical to manufacture and/or operate because of several basic problems. The common rotary internal combustion engine utilizes a triangular rotor revolving in an epitrochoidal cavity. The surface of the epitrochoid must be very precisely formed and very carefully machined in order for the rotary piston to function properly. This causes numerous manufacturing problems.

Another basic problem is in the sealing of the apexes of the triangular piston such that the combustion chambers defined by sides of the piston and the cavity walls will contain the explosive charge and drive the piston without the objectionable blow-by into other of the chambers thus formed. Furthermore, these engines have been designed for a single explosion per cycle and the parts rotate and move at nonuniform or different speeds, creating bearing and wear problems.

The device in which this invention is embodied comprises, generally an engine having a housing which includes a cavity of generally rectangular shape and in which is received a generally triangular piston. A crankshaft journaled in the housing has a throw driven by the piston. Combined inlet and exhaust ports extend into the cavity on opposite sides of the engine for the intake and exhaust of air to the combustion chambers. Fuel is introduced into the combustion chambers at the proper time and the mixture is ignited by conventional means, such as a spark plug. The triangular piston rotates about its own axis as well as rotating about the axis of the cavity.

The construction thus provided permits two explosions per cycle as well as uniform rotational speed of the various moving parts. This provides a much better efficiency. The engine may be operated at a high speed to eliminate the sealing problem, the apexes of the piston being closely adjacent the cavity walls but not engaging the walls during normal operation of the engine. The power that might be lost due to this clearance is easily offset by the lack of friction that would be present if sealing means were used, and any leakage will be minimized by the high engine speed.

These and other advantages will become more apparent from the following description and drawings, in which.

Figure 1:
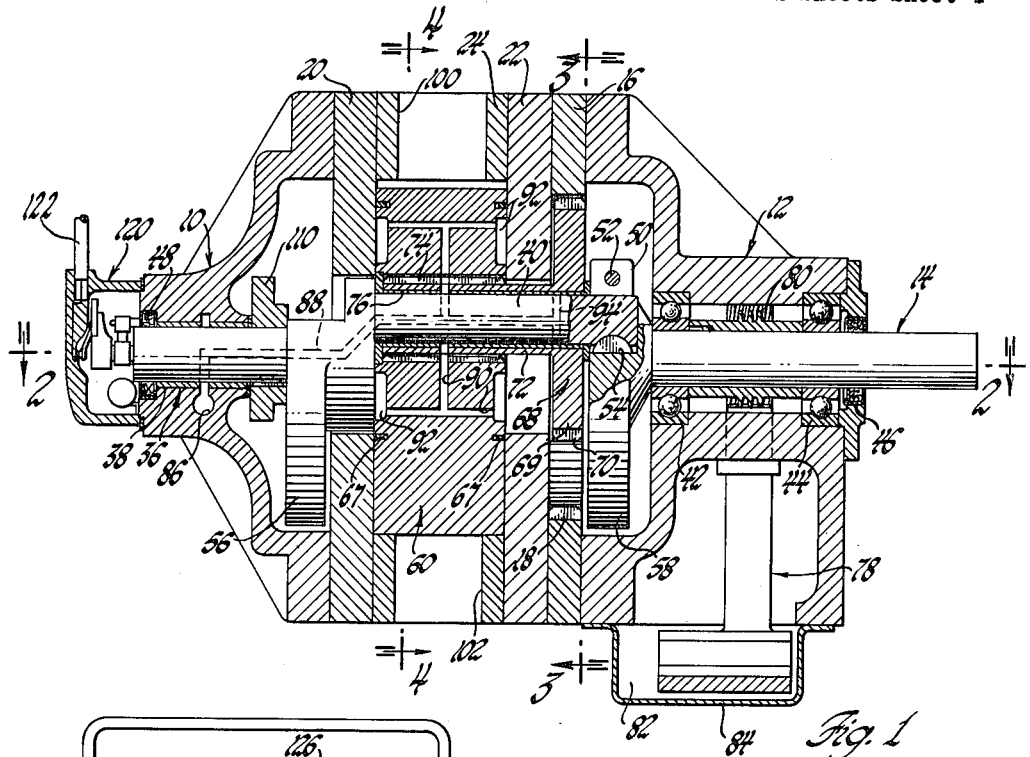
FIGURE 1 is a longitudinal cross-sectional view of the rotary internal combustion engine embodying this invention.
Figure 2:
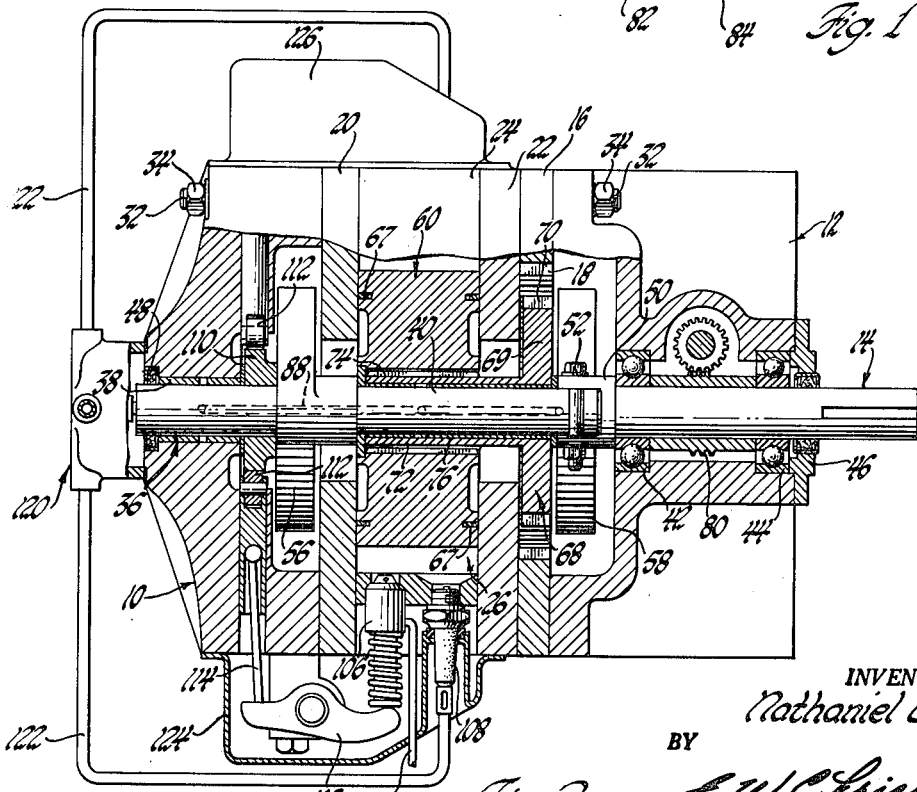
FIGURE 2 is a cross-sectional view of the engine illustrated in FIGURE 1 taken substantially along the line 2—2 of FIGURE 1 and looking in the direction of the arrows.

Referring more particularly to the drawings, FIGURES 1 and 2 best illustrate the general construction of the engine. The engine includes end members, illustrated generally by the numerals 10 and 12, respectively, which may be formed of castings or forgings, or the like. A crankshaft, illustrated generally by the numeral 14 is journaled in the members as shown. Crankshaft 14 will be more fully hereinafter described.

Figure 3:
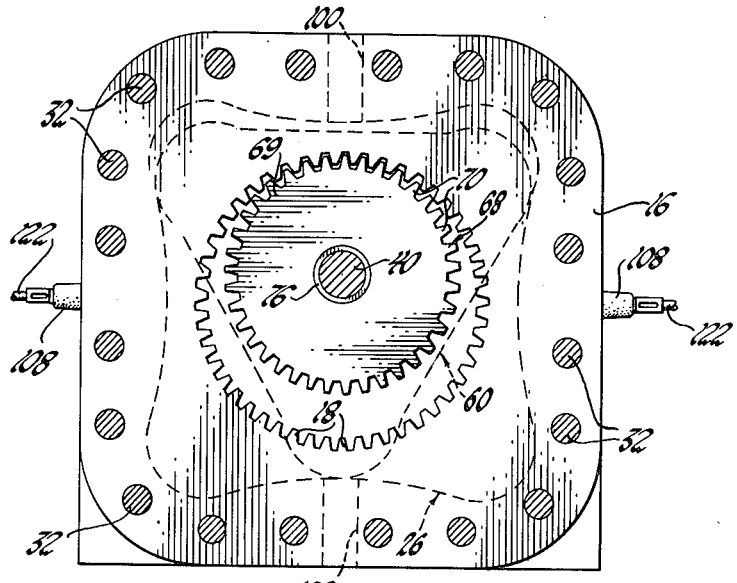
FIGURE 3 is a lateral cross-sectional view of the engine of FIGURE 1 taken substantially along the line 3—3 of FIGURE 1 and looking in the direction of the arrows and FIGURE 4 is a lateral cross-sectional view of the engine illustrated in FIGURE 1 taken substantially along the line 4—4 of FIGURE 1 and looking in the direction of the arrows.

Adjacent the end member 12 is a stationary gear 16 having a plurality of teeth 18, best illustrated in FIGURE 3 and forming an internal gear. The outer periphery of gear plate 16 is substantially the same as that of the end member 12. Adjacent the end member 10 is an end plate 20, and adjacent the stationary gear plate 16 is a similar end plate 22. End plates 20 and 22 are separated by a peripheral plate member 24, best illustrated in FIGURE 4 as having a generally rectangular opening formed therein. The outer surface of peripheral plate 24 is substantially the same as the periphery of the members 10 and 12 and the end plates 20 and 22.

Figure 4:
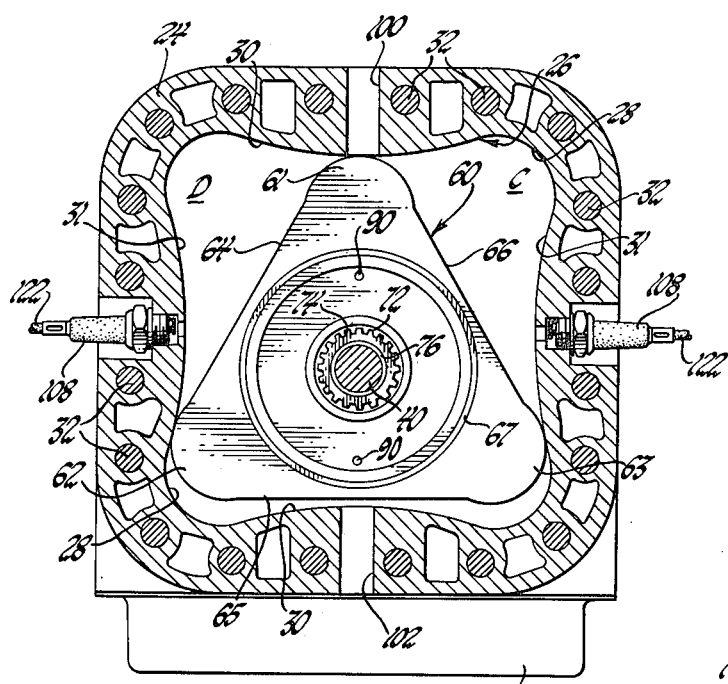

Thus, plates 20 and 22 and peripheral plate 24 define a chamber, indicated generally by the numeral 26 and best illustrated in FIGURE 4, which may be said to be generally rectangular in shape. The chamber 26 may be provided with arcuate corners 28 and arcuate side walls 30 and 31, for purposes to be hereinafter described. The castings 10 and 12 and the plates 20, 22 and 24, as well as the stationary gear plate 16, are secured together by a plurality of tie bolts 32, properly secured by nuts 34. Thus, these members form a solid unit.

The crankshaft 14, as illustrated in FIGURES 1 and 2, is journaled in the member 10, as at 36, for rotation relative to the member 10. A suitable bearing sleeve, or the like, 38 may be provided. A crank throw 40 is provided in the crankshaft 14, having an axis which is offset but parallel to the axis of the remainder of the crankshaft. The purpose for this will be later described. The opposite end of crankshaft 14 is supported in member 12, as by bearing assemblies 42 and 44. A suitable seal and retainer assembly 46 prevents the leakage of oil along the crankshaft 14, and a suitable seal 48 at the opposite end of the crankshaft seals that end.

In order to assemble the crankshaft 14 in the engine, it may be made in two pieces, as illustrated in FIGURES 1 and 2. As shown, the left-hand portion and the crank throw 40 are of one piece and the right-hand portion is a separate piece. The two are held together by means of a conventional bifurcated portion 50 received over the end of the throw 40, and the parts are clamped together by means of a nut and bolt 52. A key, or the like, 54 insures positive rotation of the two together.

For proper balancing of the crankshaft, counterweights 56 and 58 may be integrally formed on the crankshaft 14 and are of suitable size and weight to balance the rotating parts of the engine.

A triangular piston or rotor, illustrated generally by the numeral 60, is disposed in the cavity 26 formed in the engine. Piston 60 has rounded apexes 61, 62 and 63, best illustrated in FIGURE 4, which are adapted to closely lie against the sides of the cavity as the piston 60 rotates. Between the apexes are side walls 64, 65 and 66, as shown. Suitable side seals 67 are disposed in the rotor 60 and engage the end plates 20 and 22 to prevent the leakage of oil thereby. Seals 67 may be of any suitable construction and biased into engagement with end plates 20 and 22 by means of springs or other devices.

In order to cause piston 60 to rotate about the axis of the cavity 26, an integral gear and sleeve, illustrated generally by the numeral 68 is provided. The gear portion 69 has a plurality of teeth 70 which engage the teeth 18 of the stationary gear 16. The sleeve portion 72 extends axially of the gear 68 and is splined or otherwise non-rotatably secured, as at 74, to the triangular piston 60. Thus, the piston 60 rotates with the sleeve 72. The piston 60 and sleeve 72 are received on the crank throw 40 with suitable bearing means 76 disposed therebetween.

It may be noted in FIGURES 3 and 4 that the triangular piston 60 has two different rotations. Piston 60 rotates about the axis of the cavity 26 because of the movable gear 68 and stationary gear 16. The piston also rotates about the axis of the crank throw 40 and in a direction opposite to the direction of rotation of the crankshaft 14.

In order to properly lubricate the various moving parts of the engine a conventional oil pump, illustrated generally by the numeral 78, is provided adjacent one end of the crankshaft 14. A suitable worm or gear 80 may be secured to and rotated with the crankshaft 14 to drive the oil pump 78. A sump 82 may be provided by a sheet metal cover 84 secured to the member 12 in any suitable manner. The oil may be pumped through an oil passage 86 in the member 10 to a passage 88 in the crankshaft 14. Passage means 90 are provided in the triangular piston 60 to convey lubricating oil to the pockets 92, lubricating the walls of the end plates 20 and 22. Passage 88 also conveys oil to cross passages 94 for lubrication of the gears and for return to the oil sump 82 in any suitable manner.

Extending through the peripheral plate 24 and on opposite sides thereof are ports 100 and 102. These ports serve as both intake and exhaust ports for the cavity 26 and provide the necessary air for the combustion process. This will be more fully hereinafter described. Also mounted in the peripheral plate 24 and on opposite sides thereof are conventional fuel injector assemblies, illustrated generally by the numeral 106, and conventional spark plugs 108. Both fuel injectors 106 and spark plugs 108 communicate with the interior of the cavity 26 in the engine. A timing cam 110 is secured to the crankshaft 14 in any suitable manner and drives cam followers 112 and push rods 114 to oscillate suitable rocker arms 116 for actuation of the fuel injector 106. Fuel may be conveyed to the fuel injector assembly 106 by a suitable conduit 118. The cam 110 is properly timed for proper operation of the fuel injectors at opposite sides of the engine.

A distributor assembly, illustrated generally by the numeral 120, is driven by the crankshaft 14 to cause spark plug 108 to actuate, the spark plugs being connected to the distributor by means of electrical conduits 122. Thus, the fuel and air mixture injected into the cavity 26 may be ignited at the proper time to operate the engine.

The fuel injector assembly 106 and the push rod-rocker arm assemblies 114–116 are protected by suitable sheet metal covers 124 and 126 secured to the engine in any suitable manner.

The operating cycle of the engine is as follows. The crankshaft 14, viewing FIGURE 4, rotates in a clockwise direction. The triangular piston 60 is caused to rotate in a counterclockwise direction. With the parts in the position shown in FIGURE 4, the triangular piston 60 has expelled exhaust gases at port 102 resulting from an explosion which occurred in combustion chamber D and between side wall 65 and left side wall 31. Side wall 66 of the triangular piston 60 is moving away from the right side wall 31 of the cavity 26 because of an explosion which has occurred in combustion chamber C and between side wall 66 and right hand side wall 31. Incoming air through port 100 has filled chamber D and the apex 61 of rotor 60 has closed the port 100 to further incoming air. Exhaust gases are now beginning to be expelled through the passage 100 from the combustion in chamber C. Side wall 64 of the triangular piston 60 is moving toward the left side wall 31 of the cavity and is beginning to compress the air drawn into chamber D through passage 100. This air will be compressed and mixed with fuel injected into chamber D, the mixture being ignited by the spark plug in combustion chamber D to cause further rotation of the triangular piston 60. Air will be drawn into the cavity 26 through port 102 for compression by side wall 65 moving toward right side wall 31.

This cycle is repeated as the crankshaft revolves, and two intakes, two exhausts, two compressions, and two power impulses take place for each crankshaft revolution. The power stroke is seen to be effective for 90° of crankshaft rotation. Because of the dual rotation of the piston 60 in the cavity 26, the apexes of the piston follow closely the contour of the cavity. However, there is no engagement between the piston 60 and the walls of the cavity. This eliminates the wear and sealing problems hitherto known.

What is claimed is:

1. A rotary internal combustion engine comprising:

a stationary housing including axially spaced end walls and a peripheral wall, said peripheral wall interconnecting the end walls to form a cavity having an axis;

said peripheral wall comprising first and second pairs of oppositely disposed wall portions, said pairs of wall portions being convex as viewed from said axis, said first pair of wall portions being substantially perpendicular to said second pair of wall portions, and corner portions interconnecting said wall portions of the first pair of said wall portions of the second pair, said corner portions being concave as viewed from said axis, said cavity thus being of generally rectangular cross-section;

a generally triangular piston rotatably received in said cavity, said piston having three working faces disposed at 60° to each other and connected with one another by apexes, said apexes being arcuate and convex outwardly of said rotor;

means to move the axis of said piston rotatably about the axis of said cavity at a fixed distance therefrom, said piston axis being maintained parallel to said cavity axis, said piston being rotatable about its own axis whereby the piston rotation about its own axis is in the opposite direction as the rotation of the piston axis about said cavity axis;

the curvature of said wall portions and said corner portions of said peripheral wall being such that said piston apexes remain at all times closely adjacent said peripheral wall;

said piston working faces being displaced from said peripheral wall at all times, said piston working faces cooperating with said peripheral wall and the end walls of said housing to form three rotatable variable volume combustion chambers;

A combination inlet and exhaust port formed in each wall of the first pair of wall portions and generally intermediate the corner portions thereof and communicating with the cavity, each port adapted to permit air to enter and products of combustion to exhaust from the combustion chambers; and fuel injection means and ignition means in each wall of the second pair of wall portions and generally intermediate the corner portions thereof and communicating with the cavity, each fuel injection means adapted for introducing fuel directly into the combustion chambers and each ignition means adapted for igniting fuel in the combustion chambers;

said combustion chambers being rotatable around the axis of the cavity and along each wall of the first and second pairs of wall portions to undergo cycles of sequential communication with each of the ports and each of the fuel injection and ignition means in alternating order, the smallest volume of each combustion chamber occurring during each cycle when the piston working face forming one wall of such chamber is substantially opposite and parallel to a wall of the first and second pairs of wall portions which forms another wall of such chamber.

2. A rotary internal combustion engine as defined in claim 1 and further comprising:

a stationary gear in the housing and having an axis coinciding with the axis of the cavity;

and a movable gear secured to the piston and having an axis coinciding with the axis of the piston, said movable gear engaging the stationary gear and causing rotation of the piston about its own axis and the axis of the cavity;

and wherein said means to move the piston axis about the cavity axis comprises a crankshaft journaled in the housing and having an axis coinciding with the axis of the cavity, said crankshaft having a throw portion in the cavity, receiving the piston and having an axis coinciding therewith.

References Cited by the Examiner

UNITED STATES PATENTS

| | | | |
|---|---|---|---|
| 457,294 | 8/91 | Tilden | 123—8 |
| 1,389,189 | 8/21 | Feuerheerd | 123—8 |
| 1,892,217 | 12/32 | Moineau | 123—8 |
| 2,162,771 | 6/39 | Winans | 123—8 |
| 2,612,879 | 10/52 | Hibbard | 123—16 |
| 2,947,290 | 8/60 | Froede | 123—8 |
| 2,988,065 | 6/61 | Wankel et al. | 123—8 |
| 2,994,277 | 8/61 | Merritt | 123—8 |

FOREIGN PATENTS 103,413　6/99　Germany.

KARL J. ALBRECHT, *Primary Examiner.*

RALPH H. BRAUNER, JOSEPH H. BRANSON, Jr., SAMUEL LEVINE, *Examiners.*